US008808908B2

(12) United States Patent
You et al.

(10) Patent No.: US 8,808,908 B2
(45) Date of Patent: Aug. 19, 2014

(54) BATTERY MODULE OF NOVEL STRUCTURE

(75) Inventors: Seungjae You, Daejeon (KR);
Sung-Woo Kim, Seo-gu Daejeon (KR);
John E. Namgoong, Daejeon (KR);
Jisang Yu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1497 days.

(21) Appl. No.: 11/564,524

(22) Filed: Nov. 29, 2006

(65) Prior Publication Data
US 2007/0141460 A1 Jun. 21, 2007

(30) Foreign Application Priority Data

Nov. 30, 2005 (KR) ........................ 10-2005-0115180

(51) Int. Cl.
*H01M 2/24* (2006.01)
*H01M 2/26* (2006.01)
*H01M 2/10* (2006.01)
*H01M 2/08* (2006.01)
*H01M 2/02* (2006.01)

(52) U.S. Cl.
CPC .............. *H01M 2/26* (2013.01); *H01M 2/0287* (2013.01); *H01M 2/1077* (2013.01); *H01M 2/08* (2013.01); *Y02E 60/12* (2013.01)
USPC ...................................................... 429/179

(58) Field of Classification Search
CPC .......... H01M 2/266; H01M 2/26; H01M 2/08
USPC ................................................ 429/185, 179
See application file for complete search history.

(56) References Cited

U.S. PATENT DOCUMENTS

| | | | | |
|---|---|---|---|---|
| 3,844,841 A | * | 10/1974 | Baker | 429/90 |
| 4,646,430 A | * | 3/1987 | Clarke | 29/623.1 |
| 5,985,480 A | * | 11/1999 | Sato et al. | 429/65 |
| 7,608,360 B2 | * | 10/2009 | Wiepen | 429/211 |

(Continued)

FOREIGN PATENT DOCUMENTS

| | | |
|---|---|---|
| JP | 2002-237287 | 8/2002 |
| JP | 2004-063278 | 2/2004 |
| JP | 2005-135743 | 5/2005 |
| KR | 10-2004-0054128 | 6/2004 |
| TW | I227693 | 2/2005 |

OTHER PUBLICATIONS

English Traslation of JP 2004/063278.*

*Primary Examiner* — Milton I Cano
*Assistant Examiner* — Stephen Yanchuk
(74) *Attorney, Agent, or Firm* — Birch, Stewart, Kolasch & Birch, LLP

(57) ABSTRACT

A battery module has a plurality of batteries, each having an electrode assembly mounted in a battery case including a metal layer and a resin layer, as unit cells, are stacked one on another in the thickness direction, wherein the battery module is constructed such that electrode leads of each unit cell are bent and placed on an upper-end sealing part of each unit cell, through-holes for mechanical coupling and electrical connection are formed in the electrode leads and the sealing part such that the through-holes of the electrode leads communicate with the corresponding through-holes of the sealing part, respectively, and conductive coupling members are inserted through the through-holes of the unit cells. The battery module accomplished a maximum reduction in volume, increasing sealability of the sealing part, and easily accomplishing the electrical connection and the mechanical coupling between components.

13 Claims, 3 Drawing Sheets

(56) References Cited

U.S. PATENT DOCUMENTS

2001/0051298 A1* 12/2001 Hanafusa et al. ............. 429/162
2004/0106038 A1* 6/2004 Shimamura et al. .......... 429/152
2004/0121231 A1* 6/2004 Kim ............................... 429/181
2005/0140338 A1* 6/2005 Kim et al. ..................... 320/150
2005/0153200 A1* 7/2005 Wiepen ......................... 429/160

* cited by examiner

BATTERY MODULE OF NOVEL STRUCTURE

FIELD OF THE INVENTION

The present invention relates to a battery module having a structure in which a plurality of batteries, each having an electrode assembly mounted in a battery case made of a laminate sheet including a metal layer and a resin layer, as unit cells, are stacked one on another in the thickness direction, and, more particularly, to a battery module constructed such that electrode leads of each unit cell are bent and placed on an upper-end sealing part of each unit cell, through-holes for mechanical coupling and electrical connection are formed in the electrode leads and the sealing part such that the through-holes of the electrode leads communicate with the corresponding through-holes of the sealing part, respectively, and conductive coupling members are inserted through the through-holes of the unit cells, respectively, whereby the electrical connection and the mechanical coupling between components constituting the battery module are accomplished.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

Secondary batteries have different structures depending upon outputs and capacities required by applications and products, to which the secondary batteries are applied. For example, small-sized mobile devices, such as mobile phones, personal digital assistants (PDAs), digital cameras, and laptop computers, use one or several small-sized, lightweight cells for each device according to the reduction in size and weight of the corresponding products. On the other hand, medium- or large-sized devices, such as electric bicycles, electric vehicles, and hybrid electric vehicles, use a battery module (or battery pack) having a plurality of unit cells electrically connected with each other because high output and large capacity are necessary for the medium- or large-sized devices. The size and weight of the battery module is directly related to the receiving space and output of the corresponding medium- or large-sized device. For this reason, manufacturers are trying to manufacture small-sized, lightweight battery modules. Furthermore, devices which are subject to a large number of external impacts and vibrations, such as electric bicycles and electric vehicles, require stable electrical connection and physical coupling between components constituting the battery module. In addition, a plurality of unit cells are used to accomplish high output and large capacity, and therefore, the safety of the battery module is regarded as important.

Generally, a medium- or large-sized secondary battery module is manufactured by receiving a plurality of unit cells in a case (housing) having a predetermined size and electrically connecting the unit cells with each other. A prismatic secondary battery or a pouch-shaped secondary battery, which can be stacked with high integration, is used as the unit cell. Preferably, the pouch-shaped secondary battery is normally used as the unit cell, because the pouch-shaped secondary battery is lightweight and has a relatively high safety.

However, the pouch-shaped battery, which is normally used as the unit cell of the battery module, has the following several problems in spite of the above-mentioned advantages.

First, the pouch-shaped battery has an electrode assembly mounted in a battery case made of a laminate sheet including a metal layer and a resin layer. For this reason, it is required to connect electrode taps in the battery case to corresponding electrode leads, thereby forming electrode terminals protruding to the outside, in order that the electrode assembly is electrically connected to the outside. As a result, the size of the pouch-shaped battery is increased. In addition, the electrode terminals are generally connected with the corresponding electrode terminals via wires, plates, or bus bars using welding. However, the welding operation is complicated and difficult.

Secondly, the electrode assembly of the pouch-shaped battery is mounted in the battery case in a sealed state by seaming an upper laminate sheet part and a lower laminated sheet part of the laminate sheet with each other. However, the electrode terminals must be bonded to the laminate sheet at some of the seamed region (sealing part) of the laminate sheet, at which the electrode terminals protrude to the outside. Consequently, even when using an additional polymer adhesive, the sealability at the seamed region is not sufficient. As a result, the electrode terminals and the laminate sheet may be easily separated from each other under harsh conditions, which results in the defectiveness of the battery.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have developed a battery module constructed such that electrode leads of each unit cell are bent and placed on an upper-end sealing part of each unit cell, through-holes are formed in the electrode leads and the sealing part such that the through-holes of the electrode leads communicate with the corresponding through-holes of the sealing part, respectively, and coupling members, such as fasteners, are inserted through the through-holes of the unit cells, respectively, thereby accomplishing the maximum reduction in volume of the battery module, increasing sealability of the sealing part, from which the electrode leads protrude, and easily accomplishing the electrical connection and the mechanical coupling between components constituting the battery module, and completed the present invention.

In accordance with the present invention, the above and other objects can be accomplished by the provision of a battery module having a structure in which a plurality of batteries, each having an electrode assembly mounted in a battery case made of a laminate sheet including a metal layer and a resin layer, as unit cells, are stacked one on another in the thickness direction, wherein the battery module is constructed such that electrode leads of each unit cell are bent and placed on an upper-end sealing part of each unit cell, through-holes for mechanical coupling and electrical connection are formed in the electrode leads and the sealing part such that the through-holes of the electrode leads communicate with the corresponding through-holes of the sealing part, respectively, and conductive coupling members are inserted through the through-holes of the unit cells, respectively, whereby the electrical connection and the mechanical coupling between components constituting the battery module are accomplished.

The expression "the electrode leads are bent and placed on the sealing part" in the specification means that the electrode leads protruding from the cell body of each unit cell are bent toward the unit cell by 180 degrees, and are then tightly attached to the upper-side surface or the lower-side surface of the sealing part. Since the electrode leads are integrated with the cell body of each unit cell as described above, the size of a battery module is reduced by the bent length of the electrode lead. Preferably, the electrode leads are bent downward and tightly attached to the lower-side surface of the sealing part.

When the through-holes are formed in the electrode leads and the sealing part of each unit cell, there may occur burrs at the metal layer constituting the laminate sheet and the electrode leads, and therefore, the metal layer and the electrode leads may be brought into contact with each other. For this reason, it is preferable that an insulative member be interposed between the bent electrode leads and the sealing part of each unit.

The inner diameter of through-holes is not particularly restricted so long as the coupling members having an appropriate outer diameter can be easily inserted through the through-holes while the sealability of the sealing part is not lowered. In order to prevent the contact between the metal layer of the laminate sheet and the coupling members when forming the through-holes, however, it is preferable that the through-holes formed in the sealing part have a diameter greater than that of the through-holes formed in the electrode leads.

The through-holes may be formed by drilling after the electrode leads are bent and placed on the sealing part as described above. According to circumstances, the through-holes may be formed in the sealing part, on which the bent electrode leads are placed, by drilling after the through-holes are previously formed in the electrode leads by drilling, or the electrode leads may be bent and placed on the sealing part after the through-holes are previously formed in the electrode leads and the sealing part by drilling.

In a preferred embodiment, each of the coupling members is a fastener having a thread part formed at the outer surface thereof. The fasteners are inserted through the through-holes of the unit cells stacked one on another in the thickness direction, whereby the unit cells are not only electrically connected with each other but also mechanically coupled with each other. In this case, it is preferable that conductive nuts be coupled to opposite ends of each of the coupling members at the uppermost and lowermost ones of the unit cells, respectively, thereby securely fixing the coupling members and securely maintaining the stacking structure of the unit cells.

According to circumstances, layer members, each having a through-hole for allowing the corresponding coupling member to be inserted therethrough, may be interposed between the respective unit cells.

Each of the layer members is made of a conductive material at least at the regions thereof contacting the electrode leads, whereby the electrical connection between the electrode leads is easily accomplished. Preferably, each of the layer members is a hollow member including an upper part and a lower part, which are made of a conductive material, and a middle part, which is made of an insulative material. The layer members may coupled to the through-holes of the unit cells so as to prevent the contact between the metal layer of the laminate sheet and the coupling members in the through-holes.

In a preferred embodiment, plate-shaped members are interposed between the nuts and the corresponding sealing parts and/or between the layer members and the corresponding sealing parts, whereby the sealing part is effectively prevented from being damaged due to the nuts or the layer members when these components are coupled with each other. The plate-shaped members are not particularly restricted. Preferably, each of the plate-shaped members is a reinforced plastic sheet having a thickness of 1 to 4 mm. As a representative example of the reinforced plastic sheet, there may be preferably used acrylonitrile butadiene styrene (ABS) having appropriate strength and fire retardancy.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
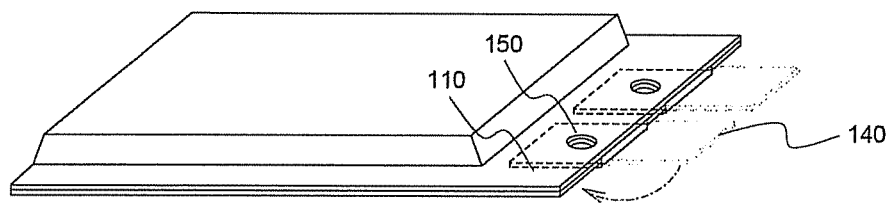
FIG. 1 is a perspective view illustrating a unit cell constituting a battery module according a preferred embodiment of the present invention.

FIG. 1 is a perspective view typically illustrating an exemplary unit cell constituting a battery module according a preferred embodiment of the present invention.

Referring to FIG. 1, a unit cell 100 includes an electrode assembly (not shown) of a cathode/separator/anode structure mounted in a pouch-shaped battery case made of an aluminum laminate sheet in a sealed state. Plate-shaped electrode leads 140 protrude from an upper-end sealing part 110a of the laminate sheet. The electrode leads 140 are bent downward and then placed on the lower-side surface of the upper-end sealing part 110a, as indicated by an arrow. Through-holes 150 are formed in the electrode leads 140 and the upper-end sealing part 110a such that the through-holes 150 of the electrode leads 140 communicate with the corresponding through-holes 150 of the upper-end sealing part 110a. In the course of bending the electrode leads 140 and forming the through-holes 150, an insulative member may be interposed between the respective electrode leads 140 and the upper-end sealing part 110a, as will be described below with reference to FIG. 2.

Figure 2:
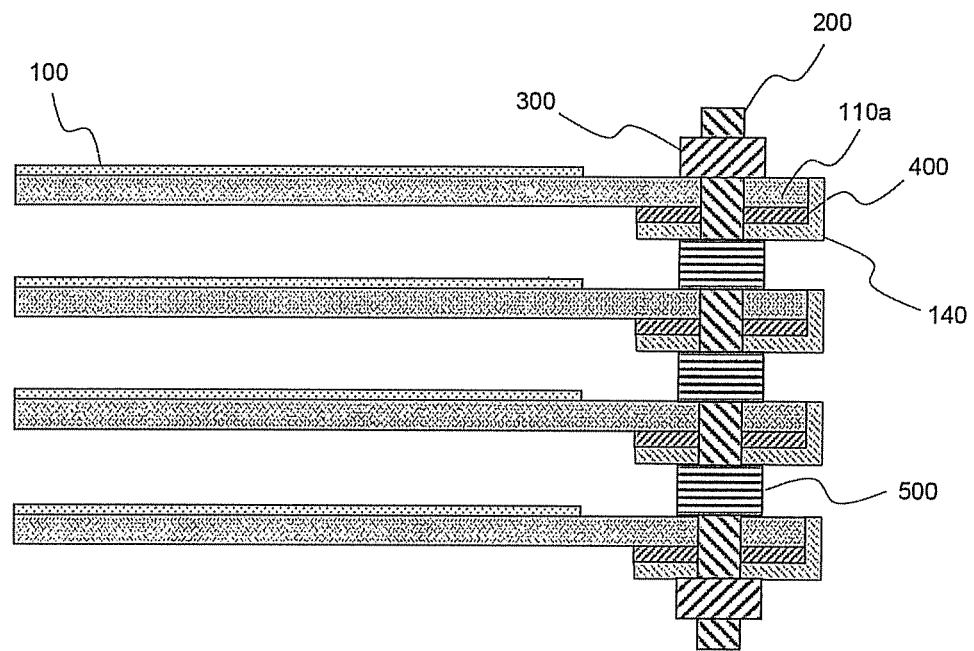
FIGS. 2 and 3 are side views, in section, illustrating unit cells, one of which is shown in FIG. 1, stacked one on another in the thickness direction and connected with each other by means of a fastener.

FIG. 2 is a side view, in section, typically illustrating unit cells, one of which is shown in FIG. 1, stacked one on another in the thickness direction and connected with each other.

Referring to FIG. 2, a plurality of unit cells 100 are stacked one on another in the thickness direction. Each of the unit cells 100 is constructed in a structure in which each electrode lead 140 is bent and placed on the lower-side surface of the sealing part 110a, and an insulative member 400 is interposed between the electrode lead 140 and the sealing part 110a. A fastener 200, as a coupling member, is inserted through a through-hole formed in each unit cell 100 such that the through-hole communicates with the electrode lead 140 and the sealing part 110a.

On opposite ends of the fastener 200 are fitted nuts 300, respectively, to fix the unit cells 100 and maintain the stacking structure of the unit cells 100. In consideration of the thickness of the unit cells 100, a layer member 500 is interposed between the respective unit cells 100.

Due to the above-described stacking and coupling structure, the size of a battery module is reduced by the bent length of the electrode lead 140. Also, it is possible to accomplish the electrical connection between the unit cells 100 without using a conventional mounting member (for example, a cartridge or the like). In addition, the sealing part 110a of each unit cell 100, which has a low mechanical strength, is bent, and therefore, the thickness of the sealing part 110a is doubled. In this state, the mechanical coupling between the unit cells 100 is performed. Consequently, it is possible to increase the structural stability of the battery module to a desired degree even by the simple coupling method.

Figure 3:
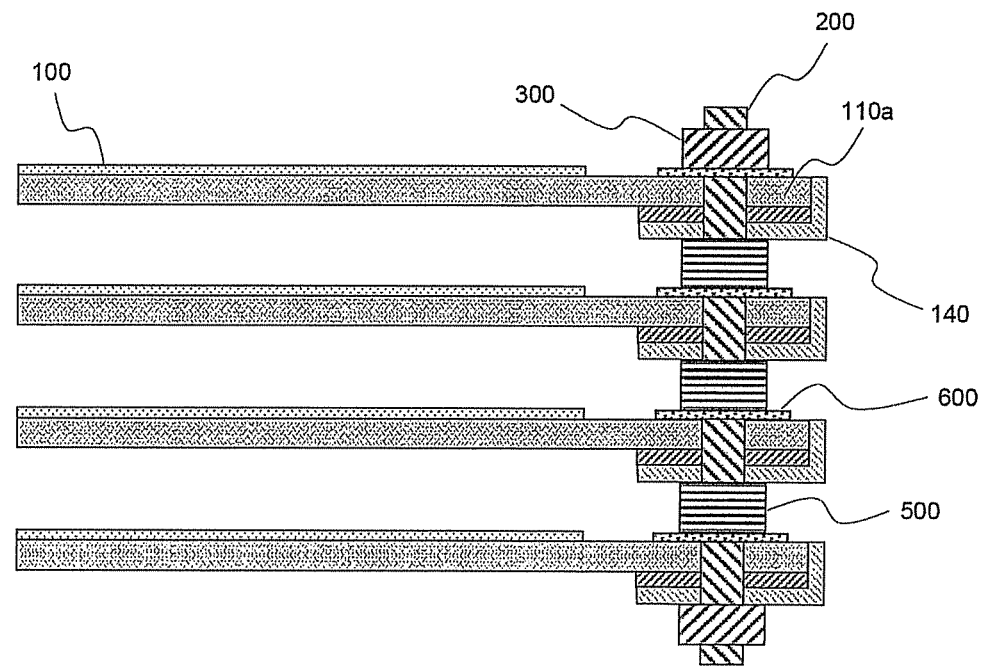

Another example is illustrated in FIG. 3. Referring to FIG. 3, thin reinforced plastic sheets 600 are interposed between one of the nuts 300 and the corresponding sealing part 110a and between the layer members 500 and the sealing parts 110a, respectively. The reinforced plastic sheets 600 serve to prevent the sealing parts 110a from being damaged due to the nuts 300 and the layer members 500 when the nuts 300 and the layer members 500 are coupled to the fastener 200 so as to fix the unit cells 100.

Figure 4:
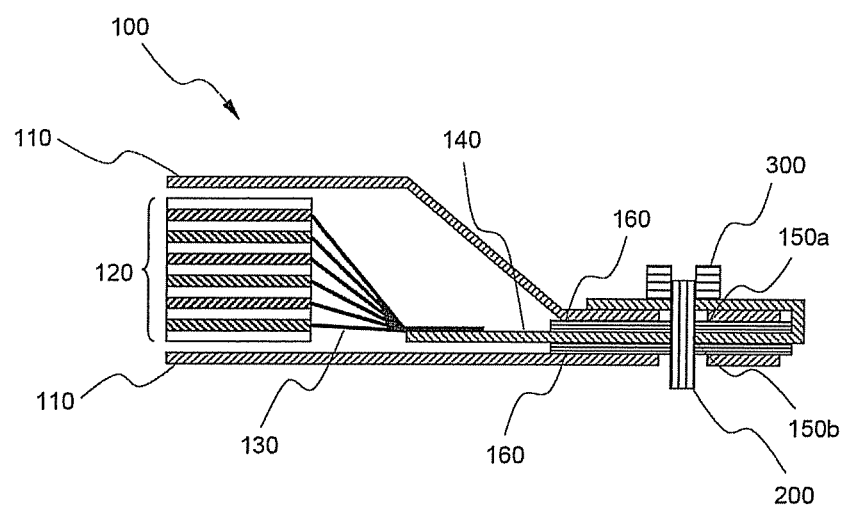
FIG. 4 is an enlarged see-through view illustrating a coupling region between one of the unit cells and the fastener in FIG. 2.

FIG. 4 is an enlarged see-through view typically illustrating a coupling region between one of the unit cells and the fastener in FIG. 2.

Referring to FIG. 4, the unit cell 100 is constructed in a structure in which an electrode assembly 120 including cathodes, anodes, and separators is mounted in the battery case made of the laminate sheet 110, and a plurality of electrode taps 130 are fixed to the electrode lead 140 by welding so as to electrically connect the electrode assembly 120 to the outside.

When sealing the battery case made of the laminate sheet 110, additional adhesive films 160 are used to attach the electrode lead 140 and the upper and lower laminate sheet parts of the laminate sheet 110 to each other, whereby the sealability of the protruding region of the electrode lead 140 is increased. The electrode lead 140 is bent and placed on the sealing part 110a, and then the through-hole is formed by drilling. After that, the fastener 200 is inserted through the through-hole so as to perform the secure coupling between the electrode lead 140 and the sealing part 110a. Consequently, the sealing part of the laminate sheet 110 has higher sealability due to an adhesive force due to the thermal welding and a mechanical coupling force due to the use of the fastener 200.

When drilling the through-hole, it is necessary to form the through-hole such that a diameter 150b of the through-hole in the electrode lead is greater than a diameter 150a of through-hole in the laminate sheet so as to prevent the contact between the metal layer (not shown) inside the laminate sheet and the fastener 200.

Figure 5:
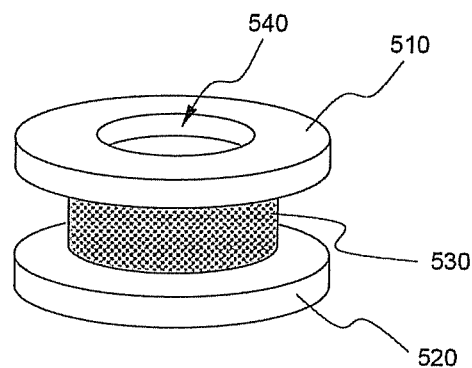
FIG. 5 is a perspective view illustrating a layer member disposed between the respective unit cells while the layer member is aligned with corresponding through-holes of the respective unit cell in FIG. 2.

FIG. 5 is a perspective view typically illustrating a layer member disposed between the respective unit cells while the layer member is aligned with corresponding through-holes of the respective unit cell in FIG. 2.

Referring to FIG. 5, the layer member 500 includes an upper part 510 and a lower part 520, which are made of a conductive material. Consequently, when the layer member 500 is disposed between the respective unit cells (not shown), and therefore, the layer member 500 is brought into contact with the electrode leads of the unit cells, the electrical connection between the layer member 500 and the electrode leads is accomplished. On the other hand, the layer member 500 further includes a middle part 530, which is made of an insulative material. Consequently, when the coupling member (not shown) is inserted through the layer member 500, the occurrence of internal short circuits is prevented. In addition, the layer member 500 further includes a through-hole 540, through which the coupling member (not shown) is inserted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module having the novel structure according to the present invention has the effect of accomplishing the maximum reduction in volume of the battery module, increasing sealability of the sealing part, from which the electrode leads protrude, and easily accomplishing the electrical connection and the mechanical coupling between components constituting the battery module.

What is claimed is:

1. A battery module comprising:
    a plurality of unit cells stacked one on another in the thickness direction, each of the plurality of unit cells comprising a battery having an electrode assembly disposed in a battery case made of a laminate sheet, the laminate sheet including a metal layer and a resin layer;
    an electrode lead on each of the plurality of unit cells, each electrode lead including an external portion which is bent and disposed on an external surface of a sealing part of the battery case of each of the plurality of unit cells;
    through-holes formed in the thickness direction through the electrode leads and the sealing part; and
    conductive coupling members inserted through the through-holes of each of the plurality of unit cells, whereby the electrical connection and the mechanical coupling constituting the battery module are accomplished,
    wherein the through-holes formed in the sealing part have a diameter greater than a diameter of the through-holes formed in the electrode leads.

2. The battery module according to claim 1, wherein an insulative member is interposed between the respective electrode leads and the sealing part.

3. The battery module according to claim 1, wherein the through-holes are formed by drilling after the electrode leads are bent and placed on the sealing part, or the through-holes are formed in the sealing part, on which the bent electrode leads are placed, by drilling after the through-holes are previously formed in the electrode leads by drilling.

4. The battery module according to claim 1, wherein the electrode leads are bent and placed on the sealing part after the through-holes are previously formed in the electrode leads and the sealing part by drilling.

5. The battery module according to claim 1, wherein each of the coupling members is a fastener having a thread part formed at the outer surface thereof.

6. The battery module according to claim 1, wherein conductive nuts are coupled to opposite ends of each of the coupling members at the uppermost and lowermost ones of the unit cells, respectively.

7. The battery module according to claim 1, further comprising layer members interposed between the respective unit cells, each of the layer members having a through-hole of an inner diameter sufficient for the corresponding coupling member to be inserted therethrough.

8. The battery module according to claim 7, wherein each of the layer members is made of a conductive material at least at the regions thereof contacting the electrode leads.

9. The battery module according to claim 7, wherein each of the layer members is a hollow member including an upper part and a lower part, which are made of a conductive material.

10. The battery module according to claim 6, wherein plate-shaped members are interposed between the nuts and the corresponding sealing parts.

11. The battery module according to claim 7, wherein plate-shaped members are interposed between the layer members and the corresponding sealing parts.

12. The battery module according to claim 10, wherein each of the plate-shaped members is a reinforced plastic sheet having a thickness of 1 to 4 mm.

13. The battery module according to claim 12, wherein the reinforced plastic sheet is made of acrylonitrile butadiene styrene (ABS).

* * * * *